US007794124B2

(12) United States Patent
Hulsey et al.

(10) Patent No.: US 7,794,124 B2
(45) Date of Patent: Sep. 14, 2010

(54) BI-DIRECTIONAL BOAT RUNNING AND EMERGENCY LIGHT APPARATUS AND METHOD

(76) Inventors: Michael Hulsey, 838 Villa Rica Hwy., Dallas, GA (US) 30157; Richard Butler, 7468 Villa Rice Hwy., Dallas, GA (US) 30157

( * ) Notice: Subject to any disclaimer, the term of this patent is extended or adjusted under 35 U.S.C. 154(b) by 99 days.

(21) Appl. No.: 11/860,662

(22) Filed: Sep. 25, 2007

(65) Prior Publication Data

US 2008/0247161 A1 Oct. 9, 2008

(51) Int. Cl.
*B60Q 1/00* (2006.01)
*F21V 1/00* (2006.01)

(52) U.S. Cl. .................. 362/477; 362/249.02; 362/276; 362/540; 362/545; 362/802

(58) Field of Classification Search ................. 362/227, 362/249, 252, 276, 477, 540, 543–545, 802, 362/249.02
See application file for complete search history.

(56) References Cited

U.S. PATENT DOCUMENTS 4,731,604 A 3/1988 Pawlowski, Jr.
4,871,996 A 10/1989 Tsunamoto et al.
4,884,173 A 11/1989 Cassidy
5,339,225 A 8/1994 Wiggerman
5,537,299 A 7/1996 Perry
5,563,577 A 10/1996 Adkins
5,602,948 A 2/1997 Currie
5,636,916 A 6/1997 Sokolowski
5,688,042 A 11/1997 Madadi et al.
5,711,591 A 1/1998 Jordan
5,890,794 A 4/1999 Abtahi et al.
5,929,788 A 7/1999 Vukosic
6,052,051 A 4/2000 Whalen
6,086,220 A 7/2000 Lash et al.
6,161,941 A * 12/2000 Tait et al. .................... 362/249
6,170,969 B1 1/2001 Dumse
6,174,078 B1 1/2001 Ohm et al.
6,293,685 B1 * 9/2001 Polkow ...................... 362/253
6,394,634 B2 5/2002 Kitchin
6,425,678 B1 * 7/2002 Verdes et al. ............... 362/244
6,499,867 B1 12/2002 Neal
6,659,632 B2 * 12/2003 Chen .......................... 362/545
7,018,081 B2 3/2006 Hopkins
7,021,782 B1 4/2006 Yerian
7,021,801 B2 4/2006 Mohacsi
7,111,961 B2 9/2006 Trenchard et al.
7,158,019 B2 1/2007 Smith (Continued)

*Primary Examiner*—Jason Moon Han
(74) *Attorney, Agent, or Firm*—Williamson Intellectual Property Law, LLC; Thomas R. Williamson, III

(57) ABSTRACT

A boat running light and emergency light apparatus and method comprising a plurality of radially projecting lights, at least one axially upward projecting light and at least one photometer, wherein the at least one photometer senses the amount of illumination from the plurality of radially projecting lights. Upon a reduction or cessation of illumination caused by failure of one or more of the plurality of radially projecting lights, the plurality of radially projecting lights are turned off and the axially upward projecting lights are illuminated to notify boaters of a faulty light while still providing redundant lighting. Additionally, the boat light is capable of flashing SOS in Morse code during an emergency situation. The lights are preferably high intensity directional light emitting diodes.

19 Claims, 3 Drawing Sheets

U.S. PATENT DOCUMENTS

| | | | | |
|---|---|---|---|---|
| 7,298,245 | B1 * | 11/2007 | VanHoose | 340/331 |
| 2001/0024369 | A1 | 9/2001 | Kitchin | |
| 2004/0105264 | A1 * | 6/2004 | Spero | 362/276 |
| 2005/0225971 | A1 | 10/2005 | Melnik | |
| 2006/0028814 | A1 | 2/2006 | Smith | |
| 2007/0165410 | A1 | 7/2007 | Rochfort | |

* cited by examiner

BI-DIRECTIONAL BOAT RUNNING AND EMERGENCY LIGHT APPARATUS AND METHOD

FIELD OF INVENTION

The present invention relates to boat running and emergency light apparatuses and methods, and more particularly to a bi-directional boat light comprising high intensity directional light emitting diodes (HIDLED), wherein the HIDLEDs are arranged into two groups. A first group emits light radially and a second group emits lights axially upward if a photometer detects a failure of any of the radially illuminating HIDLEDs.

BACKGROUND ART

There are various types of lighting devices. One device discloses a sectored light primarily for use in the marine industry incorporating LEDs as a light source. The light includes a light dispensing lens in conjunction with convex reflective elements to provide an arc of visibility with low light scatter and sharp cut off transition.

Another device discloses an integrated LED warning and vehicle lamp having a base configured to directly replace an existing vehicle lamp by insertion into the lamp's reflector shell. The integrated warning and vehicle lamp includes a first radial array of LEDs dedicated to producing the vehicle warning and/or illumination formerly produced by the vehicle lamp and a second radial array of LEDs dedicated to producing an emergency warning light signal. The second radial array may be electrically connected to an axial LED. The LEDs are supported by a lamp support at a location near the focus of the reflector shell. An interface electrical circuit modifies the electrical energy formerly fed to the vehicle lamp to a form appropriate for the LEDs in the first array. A warning signal electrical circuit energizes the second array of LEDs to produce the emergency warning light signal.

Yet another device discloses a lighting device having a plurality of high flux LEDs mounted on a heat sink and surrounded by a diffuser. The heat sink serves to transfer heat from the LEDs to the outside environment. In one embodiment the lighting device is positioned within a Fresnel lens to produce a distribution of light.

Another device discloses a self-powered safety module including a pair of end lights and a ring of circumferential lights which are selectively energized by a pushbutton switch. The module includes a housing and an inner electronic module. The inner module includes an LED display for displaying time and temperature as well as a transceiver such as a cell phone and GPS unit which are activated by a switch for an emergency mode. The switch permits selection of one of a warning mode or an SOS mode.

Still another device discloses a high-intensity light comprising a side-emitting optoelectronic device adapted to emit light of a desired color. A heat sink is positioned adjacent the optoelectronic device and a reflector at least partially surrounds the optoelectronic device. The reflector is spaced a distance from the optoelectronic device. A window portion is sized to output the light in a desired arc.

Yet another device discloses a boat light apparatus comprising a mounting block, a main upright pole, a lamp boom, a main head lamp and a bait lamp. The apparatus has a generally tubular shaped lamp boom with a distal end, proximal end and mid-region. The head lamp is attached to the distal end of the lamp boom and the bait lamp is attached along the lamp boom behind the head lamp. On the proximal end of the lamp boom is a grip handle perpendicular to the lamp boom. The lamp boom is pivotally attached in its mid-region to the main upright pole. This pivotal attachment allows the head lamp to be positioned along the vertical plane. The main upright pole is generally a tubular shaped mast with a top end and bottom end. The lamp boom is pivotally attached near the top end of the upright pole. The bottom end of the upright pole is coupled to a mounting block. The mounting block has an inner cavity to receive the bottom end of the upright pole and allows horizontal rotation of the head lamp. The mounting block is attached to the boat and provides a releasable means of attachment for the main upright pole. The handle on the proximal end of the lamp boom is used to manually position the light beam emitted from the head lamp. The lamps are wired and electric power is routed through a control switch utilized to turn either lamp on or turn the apparatus off.

Another device discloses a safety apparatus having a base, a wand coupled to the base and an illumination source retained by the wand. The base may include a recess to retain the illumination source, or an additional illumination source. The base may also include a port and a hollow interior for selectively filling the interior with ballast for support. The wand may include reflective material along the external circumference for increasing the visibility of the apparatus to on-coming traffic. The apparatus may be used to freely stand on a solid surface, or the base may be evacuated of ballast and used to buoyantly rest on the surface of an aqueous body.

Still another device discloses a pole light having a substantially tubular pole having two ends, a navigation light mounted at one end of the pole, and an ultraviolet light source positioned within the pole. The pole light is operable to emit ultraviolet light in an outward direction from the pole.

Yet another device discloses a running light fixture that includes a user aimable flood light attached to the conventional running light support shaft and plug. The flood light is provided with a strobe mechanism for providing a strobe effect that may be used by the boater to attract the attention.

Still another device discloses a boat light system for providing several different light sources in a single assembly. The boat light system includes a housing with opposite top and bottom ends. A lower extension downwardly extends from the bottom end of the housing. The lower extension has an electrical plug for electrically connecting to an electrical power supply. A pair of elongate light sources are mounted in the housing and electrically connected to the electrical plug. An upper extension is disposed upwardly from the top end of the housing and has a stage coupled thereto. An upper light source is mounted to the stage and is electrically connected to the electrical plug.

Yet another device discloses a boat light assembly for a boat having a hull with forward and rearward end, and a motor for propelling the boat disposed at the rearward end, and a boat operator stationed adjacent the rearward end, has an assembly mounted on the rearward end of the hull and comprises an upstanding rod comprised only of an acrylic material. At least a portion of the outer surface of the rod is textured or diffused. A shrouded light source is mounted adjacent the lower end of the rod to permit a diffused light to extend longitudinally through the rod for peripheral visibility through the textured outer surface of the rod, and to provide peripheral subdued lighting for the area of the boat without retarding the night vision of a boat operator positioned in the operator's station.

Another device discloses a marine safety light for maximizing a boat's visibility to other boaters during darkness and inclement weather conditions consisting of an LED array which consists of a plurality of LEDs arranged in a star configuration. The LED array preferably consists of six white LEDs evenly spaced in the horizontal plane and positioned within a Fresnel lens such that an even omni-directional distribution of light is emitted. The LED array is powered using a power circuit which includes two conventional DC to DC converters which regulate the output voltage, allowing the marine light to operate at a constant brightness for a substantial period of time on a conventional 1.5 volt power source. Further, the power circuit automatically shuts the marine safety light off when sufficient ambient light is available and provides a continuous flashing signal when the power source is low.

Still another device discloses a multi-location defense device which protects self and property. The hand-held device includes a remote-control mechanism for remotely activating an alarm system in a home, building, and/or motor vehicle, and a source of high-intensity sound emanating from the defense device, which can be electronically programmed to send an "S.O.S." signal in Morse code. Further self-defense is provided by bright lights and a spray of a chemical repellent.

Yet another device discloses a warning beacon or a light where clusters of LED are mounted on a circuit board and emit light into a conical reflector so as to provide omni-directional illumination having improved illumination intensity over its pattern of illumination by utilizing separate reflective sections each of which is preferably parabolic. Separate clusters of LEDs are arranged in rings of diameter commensurate with the diameter of each section of the reflector and are aimed at approximately the middle thereof. The illumination is deflected radially outward from each section. The total number of LEDs which provide the illumination is increased over other arrangements thereby enhancing the brightness or intensity of illumination provided by the beacon.

Another device discloses a lighting unit includes a circuit board having a number of LED packages extending outward from a front side. The printed circuit board is covered by a transparent cover, forming an outer cavity between the cover and the printed circuit board. The printed circuit board is supported by a housing, in which a second cavity is formed. In a first embodiment, the circuit board, being flexible, is wrapped around a cylindrical housing, with LED packages being directed radially outward. In a second embodiment, the circuit board is rigid, with LED packages being aligned in a common outward direction. In either embodiment, the outer cavity may be filled with a fluid used to promote cooling the LED packages.

Still another device discloses a boat alerting system for maximizing a boat's visibility to other boaters during darkness and inclement weather conditions. The device includes a hollow aluminum shaft removably secured to a boat, a water proof electronics housing secured to the hollow aluminum shaft, a transparent light housing secured to the water proof electronics housing, and a lighting means secured within the transparent light housing.

Yet another device discloses a LED lamp for use in lighted sign assemblies having a base configured to engage an associated electrical socket, a light array extending from the base, the base has conductive elements on the outer surface thereof to effect a power connection to the socket and internal contacts coupled thereto. The light array consists of three elongated circuit boards extending from the end of the base and oriented with respect to each other to form an array of triangular cross-section. Each of the circuit boards has a multiplicity of LEDs mounted upon its outer surface and spaced along its length, and a conductor connected to the diodes. A power transfer circuit electrically connects the circuit board conductor to the contacts in the base to provide electrical power to the diodes, and a generally tubular housing of light transmitting material mounted upon and extending from the end of the base in spaced relationship to the array.

Another device discloses a boat lighting system which includes a mounting bracket secured to the boat to position a portion of the bracket closer to either the port or starboard side of the boat and to position the portion at an elevation above the hull, wherein a light emitting element is secured to the portion and positioned on the bracket to illuminate in the direction of the bow and ahead of the bow, and further having a starboard green and port red color directional light emitting element secured to the bracket, wherein either the light emitting element or said directional light emitting element are energized at a time. The device further discloses a motorboat lighting system in which the motorboat has a drive transmission which includes a light emitting warning element secured to the motorboat and an apparatus for automatically energizing the light emitting warning element in response to a drive transmission position of the motorboat. This device also discloses a method for warning boats in the vicinity of a motorboat having a drive transmission which includes providing a light emitting warning element positioned on the motorboat to illuminate in an outward direction from the motorboat and connecting the light emitting warning element to a power source with a circuit, and providing a switch in the circuit to close the circuit and energize and illuminate the light emitting warning element with the drive transmission in a particular position.

Still another device discloses a fiber optic illumination device providing both emergency warning lighting and supplemental lighting for work in conditions of darkness. The device includes a fiber optic cable which transmits light radially from the cable, thus providing high visibility for the cable when it is extended from a light source, and which also transmits light axially from the light output end of the cable to provide a work light. The light source may comprise an incandescent bulb, high intensity light emitting diode, or other type of lighting, as desired, and may include a monochromatic filter to input colored light as desired to the cable. The output end of the cable may include an adjustable sheath thereon, which may be bent or flexed to hold a position as desired, and the output end of the cable may include a lens therein to focus the emitted light as desired.

Yet another device discloses a vehicular distress alert system comprising a security flasher mechanism adapted to be coupled to a vehicle's lights and with the security flasher mechanism generating and transmitting a pulsating alert signal when electrically energized for alternately activating and de-activating the vehicle's lights, thereby transmitting a visual distress alert indication and a switch mechanism coupled to the security flasher mechanism and adapted to be coupled to a vehicle's battery for energizing and de-energizing the security flasher mechanism.

Another device discloses a multiple light system for watercraft which combines navigation light and docking light capabilities. A navigation light is mounted on top of a mast which protrudes from the watercraft deck. An auxiliary light, which can comprise a docking light, is mounted on the mast by a mounting assembly. The auxiliary light draws electrical power from a bulb of the navigation light and can be independently disabled by means of a switch on the mounting bracket.

Still another device discloses an illuminated wand structure specifically intended as a boat stern running light, formed by a tubular wand member being elongated in configuration.

The wand includes at least one light source positioned adjacent either the bottom end, and adapted to emit light upwardly, or positioned adjacent the top end and adapted to emit light in a downward direction. The tubular wand has a smooth outer wall and an inner wall provided with a light diffractive surface. Light emitted from either the upper or lower light source will be diffracted along the inner wall of the elongated wand, thereby to illuminate the entire length of the wand. The wand may be provided with a light source at the bottom end and adapted to emit light upwardly, and a second light source positioned adjacent the top end to emit light in a downward direction where the wand is of a longer elongated configuration. A third light source is provided at the top end of the wand, which is enclosed by a lens globe and permits light to radiate therefrom. When illuminated, the upper light will radiate light in all directions while substantially the entire length of the elongated wand will be illuminated by either the upper or lower light sources, or both of them.

Yet another device discloses a combination running light and spot light device for a boat which includes a mast having a male fitting at its bottom end which is receivable in a female electrical receptacle. The male fitting includes electrical connectors which join with electrical connectors of the female receptacle completing an electrical connection therewith. A running light is attached to the top end of the mast and is electrically connected to the electrical connectors of the male fitting. A bracket is mounted to the mast for selected pivotal movement about the longitudinal axis of the mast, and a spot light is mounted to the bracket for movement with the bracket about the longitudinal axis of the mast. The spot light is also electrically connected to the electrical connectors of the male fitting.

Another device discloses a warning signal in response to an abnormal condition. The abnormal condition may be either the condition when a rider is no longer present on the watercraft or when the watercraft assumes a non-normal running condition such as being capsized or inverted. In some instances, the warning is provided by a flag, a light, by a warning jet spray of water and, in others, by an audible signal. The warning may be combined so that more than one type of warning is given in response to an abnormal condition.

Still another device discloses a portable hand held distress signal device having a casing member for receiving dry cell batteries with the casing having positive and negative terminals and an ON-OFF switch connected in series therewith, a dome member of generally red plastic transparent material having an end portion for receiving a signal member and an enlarged portion for receiving a control member and an engaging portion for connecting securably with a mating engaging portion of the casing member, the control member including a frame member having respective current terminals for engaging with the terminals of the casing member, a buzzer and motor in the control member connected in circuit with the terminals of the signal member, a shaft of the motor driving reduction gears which in turn rotate a metal shaft extending within the dome member, a reflector and bulb holder supported at the distal end of the metal shaft and for supplying current from one of the terminals thereto, a metal disk having a central opening for passing the metal shaft therethrough and being mounted on the frame connected to the other of the terminals, and a trolley mounted on the reflector and bulb means extending in contact with the metal disk for completing the circuit of the one terminal to the other terminal.

Laws require boats to have the appropriate lighting, particularly when running at night or non-optimal viewing conditions. Currently, if a light on a boat goes out while on the water, it is rare a replacement is available. This can lead to safety hazards, possible infractions, accidents, fines and injury. Accordingly, it is readily apparent that there is a need for a boat running and emergency light apparatus and method which minimizes and/or overcomes these deficiencies by providing a boat light with built in redundancy which can also function as a distress signal in times of an emergency. This would serve the functions of increased safety, saving lives and preventing legal infractions.

SUMMARY OF THE INVENTION

Briefly described, in a preferred embodiment, the present invention overcomes the above-mentioned disadvantages and meets the recognized need for such a device by providing a bi-directional boat running and emergency lighting apparatus and method, wherein the boat running and emergency lighting apparatus comprises a boat running light which also functions as emergency lighting and a notification system that signals when a portion of the light fails, wherein the boat light has axially upward projecting lights and radially projecting lights, and wherein if a portion of the radially projecting lights fails, the axially upward projecting lights are activated. This provides a redundancy in the lighting which does not currently exist in the field, thereby increasing safety while decreasing the likelihood of accidents and legal infractions.

According to its major aspects and broadly stated, the present invention in a preferred form is a bi-directional boat running light and emergency light apparatus and method, wherein the light comprises a plurality of radially projecting lights, at least one axially upward projecting light and at least one photometer. The at least one photometer senses if there is a reduction in light output from the radially projecting lights and if such a reduction occurs, the light disables the radially projecting lights and enables the axially upward projecting lights. Switching from radially projecting lights to axially upward projecting lights informs an operator of a boat that at least a portion of the radially projecting lights have failed while still providing the required illumination for the boat.

More specifically, in a preferred embodiment, the plurality of radially projecting lights are substantially circularly aligned, and wherein a second plurality of radially projecting lights are substantially concentrically aligned with, and disposed above, the plurality of radially projecting lights. Thus, if one set of radially projecting lights fails, a second set of radially projecting lights may be illuminated in addition to the axially upward projecting lights. Alternatively, only the second set of radially projecting lights is illuminated and the axially upward projecting lights are illuminated upon failure of the second set of radially projecting lights. The additional circle of radially projecting lights could also be utilized for additional lighting when needed, particularly during inclement weather.

In another preferred embodiment, at least a portion of the plurality of radially projecting lights are in serial electrical communication. Thus, if a single one of the plurality of radially projecting lights within a given portion fails, then all lights on the serial arrangement would fail. This increases the likelihood the photometer will sense the diminished light being produced by a particular portion of the bi-directional light, thereby trigging a response from the bi-directional light and illuminating the axially upward projecting lights.

In yet another preferred embodiment, the at least one axially upward projecting light is in switchable parallel electrical communication with the plurality of radially projecting lights. Accordingly, the at least one axially upward projecting light would continue to receive power despite a failure of the plurality of radially projecting lights.

In still another preferred embodiment, the at least one axially upward projecting light is in parallel electrical communication with another at least one axially upward projecting light. Thus, if any one of the at least one axially upward projecting lights fails, any others of the at least one axially upward projecting lights will continue to function.

In another preferred embodiment, the boat light is battery powered. One skilled in the art would recognize means of providing electricity to an object is generally well-known in the art. Accordingly, the battery powered embodiment, is meant as exemplary, and other forms of electricity are contemplated, particularly, without limitation, generators, rechargeable batteries, the boat battery, batteries of sufficient size to fit within the boat light and/or any combination thereof. Additionally, resistors, transistors, regulated power supplies, other circuitry and/or any combination thereof may be necessary to ensure the correct current is provided to the bi-directional light.

In a further preferred embodiment, the boat light further comprises a shaft, wherein the boat light is disposed on the shaft. Some navigational rules and/or laws require lights to be placed a certain height above the deck of a boat or ship. Accordingly, a shaft, pole or similar device is provided for to raise the total height of the bi-directional light.

In a preferred embodiment, the plurality of radially projecting lights is light emitting diodes (LEDs). In a further embodiment, the at least one axially upward projecting light is a light emitting diode. Using LEDs provides more light per watt of electricity, LEDs do not require color filters which can dim lights, LEDs do not require reflectors and further, LEDs have a longer lifespan than either incandescent light bulbs or fluorescent light bulbs.

In a further preferred embodiment, the plurality of radially projecting lights is high intensity directional light emitting diodes (HIDLEDs). Additionally, the at least one axially upward projecting light is a high intensity directional light emitting diode that provides direction radiation wherein the beam is narrow, thereby concentrating photon energy in the narrow beam to provide a greater range of visible light. HIDLEDs allow the plurality of radially projecting lights and at least one axially upward projecting light to be viewed for many miles and further makes the lights highly directional.

In still another preferred embodiment, the boat light further comprises a casing, wherein the plurality of radially projecting lights and the at least one axially upward projecting light are disposed within the casing. Additionally, any necessary circuitry, circuit boards, wiring, photometers and the like may also be contained within the casing to protect electronics of the present invention from damage caused by the elements or other forces.

In yet another preferred embodiment, the at least one photometer measures light output of at least a portion of the plurality of radially projecting lights. Thus, the photometer determines if a portion of the plurality of the radially projecting lights has ceased illuminating and preferably notifies boaters via a message being sent to the control panel of the boat or alternatively an indicator on the control panel is illuminated.

In a further embodiment, all of the plurality of radially projecting lights are switched off upon the photometer sensing a decrease in illumination from any of the plurality of radially projecting lights. If one of the plurality of radially projecting lights is no longer emitting light, it may be difficult for a boater to notice the difference; however, if all of the plurality of radially projecting lights are switched off, a boater is more likely to notice and accordingly can replace the light to increase safety.

In another embodiment, the at least one axially upward projecting light is illuminated if the at least one photometer optically detects at least one of the plurality of radially projecting lights is not functioning. Illuminating the axially upward projecting light ensures a boater is more likely to notice the failed radially projecting light while ensuring that boating rules and regulations regarding lighting are met. In a further preferred embodiment, notification is also provided to the boat operator that a light has ceased illuminating.

In yet another preferred embodiment, the plurality of radially projecting lights and the at least one axially upward projecting light are flashable. Flashing on and off of a light is more likely to draw attention, particularly during times of distress, and, further, some boating regulations and rules require flashing lights for certain situations and in certain positions. In a preferred embodiment, the boat light flashes at least 120 times per minute, as required by the United States Coast Guard Navigation Rules.

In still another preferred embodiment, the boat light flashes a Morse code signal and more particularly flashes SOS or similar distress signal in Morse code. Thus, given a certain condition, the boat light can flash an emergency signal to notify other boaters that the ship is in distress. Specifically, the boat light emits an emergency signal when electrical communication with an operator is lost, when physical communication with an operator is lost, upon activation of a manual switch by the boat operator or other boat occupant, when gyroscopes indicate an overturned boat and/or any combination thereof. Communication between the boat light and the operator is typically via a kill switch or "deadman's tether" as is known in the art.

In a preferred embodiment, the plurality of radially projecting lights is divided into a plurality of banks, wherein each of the plurality of banks contains a sub-plurality of the plurality of radially projecting lights. Thus, a photometer can be dedicated to each bank of the plurality of radially projecting light, simplifying the process of determining if one of the plurality of radially projecting lights has expired. Additionally, in a further preferred embodiment, each of the sub-plurality of radially projecting lights within each of the plurality of banks is in serial electrical communication. Accordingly, if there is a failure of any one of the plurality of radially projecting lights, within the bank of the plurality of radially projecting lights then all lights within the bank will be exterminated, further increasing noticability of the failure of the bi-directional light by the photometer.

In a further preferred embodiment, the plurality of banks of radially projecting lights illuminates approximately 360 degrees horizontally. Alternatively, the plurality of banks of radially projecting lights illuminate in less than 360 degrees horizontally. In a further alternate embodiment, the plurality of banks illuminates approximately 225 degrees horizontally. Additionally in a further alternate embodiment, the plurality of banks illuminates approximately 112.5 degrees horizontally. The plurality of banks may also illuminate approximately 135 degrees horizontally. In further alternate embodiments, the plurality of banks or the plurality of radially projecting lights themselves may illuminate in substantially any direction between zero degrees and 360 degrees along a horizontal plane as required by water navigation rules, regulations and procedures.

In another preferred embodiment, the light emitted from the plurality of radially projecting lights may be different colors dependent on the individual radially projecting lights.

Currently navigational rules require certain colors to be utilized during certain conditions and in certain positions of the boat. Thus, the boat light may serve as a masthead light, side lights, stern lights, towing light, all around light, flashing light, running lights and/or any combination thereof. Additionally, the boat light can direct the appropriate color in the correct direction as required by the navigational rules.

In a preferred embodiment, a light is provided, wherein the light comprises a casing, a plurality of radially projecting high intensity directional light emitting diodes disposed within the casing, wherein the plurality of radially projecting high intensity directional light emitting diodes are arranged in a plurality of banks, at least one axially upward projecting light emitting diode within the casing, and a plurality of photometers, wherein each of the plurality of photometers senses the amount of light illuminating from a specific bank of the plurality of banks of the plurality of radially projecting light emitting diodes, and wherein if any of the plurality of photometers senses a decrease in illumination from any of the plurality of radially projecting high intensity directional light emitting diodes, all of the plurality of radially projecting high intensity directional light emitting diodes are deactivated and the at least one axially upward projecting light emitting diode is illuminated. Accordingly, a light is provided which increases the visibility in comparison to incandescent or fluorescent lighting and provides redundant lighting in case of failure of the any of the plurality of radially projecting high intensity directional light emitting diodes.

In a preferred use, a method of redundant lighting is provided, wherein the method comprises the steps of illuminating a plurality of radially projecting lights, sensing light emitted by the plurality of radially projecting lights with an optical sensor, and illuminating at least one axially upward projecting light if the optical sensor detects a decrease in illumination from the plurality of radially projecting lights. Thus a method of providing redundant lighting, particularly suited for a boat is provided, thereby increasing safety, reducing accidents, notifying a boater if lights are out and reducing the likelihood of penalties for legal infractions related to the lighting of the boat. In a further use, the method of providing redundant lighting further includes deactivating all of said plurality of radially projecting lights if said optical sensor detects a decrease in illumination from said plurality of radially projecting lights.

Accordingly, a feature and advantage of the present invention is its ability to provide easy to view lighting, particularly for a boat, during darkness or inclement weather.

Another feature and advantage of the present invention is its ability to provide a boat light which is less likely to burn out.

Still another feature and advantage of the present invention is its ability to provide redundant boat lighting in case of failure of a portion of the boat lights.

Yet another feature and advantage of the present invention is its ability to display an emergency signal.

Yet still another feature and advantage of the present invention is its ability to produce SOS in Morse code.

A further feature and advantage of the present invention is its ability to optically sense when any of the lights have ceased illuminating and respond appropriately.

These and other features and advantages of the present invention will become more apparent to one skilled in the art from the following description and claims when read in light of the accompanying drawings.

BRIEF DESCRIPTION OF THE SEVERAL VIEWS OF THE DRAWINGS

The present invention will be better understood by reading the Detailed Description of the Preferred and Selected Alternate Embodiments with reference to the accompanying drawing figures, in which like reference numerals denote similar structure and refer to the elements throughout, and in which.

DETAILED DESCRIPTION OF THE PREFERRED AND SELECTED ALTERNATE EMBODIMENTS

In describing the preferred and selected alternate embodiments of the present invention, as illustrated in FIGS. 1-4, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
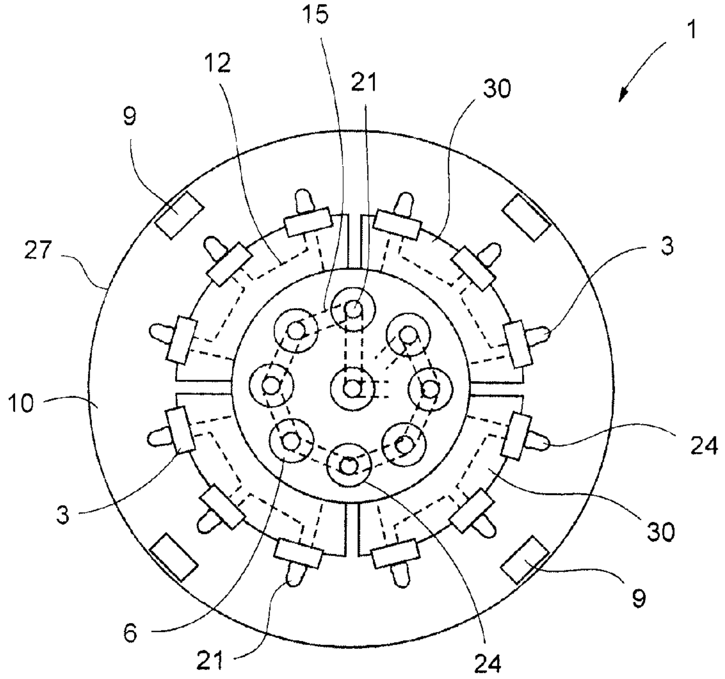
FIG. 1 is a top view of a preferred embodiment.
Figure 2:
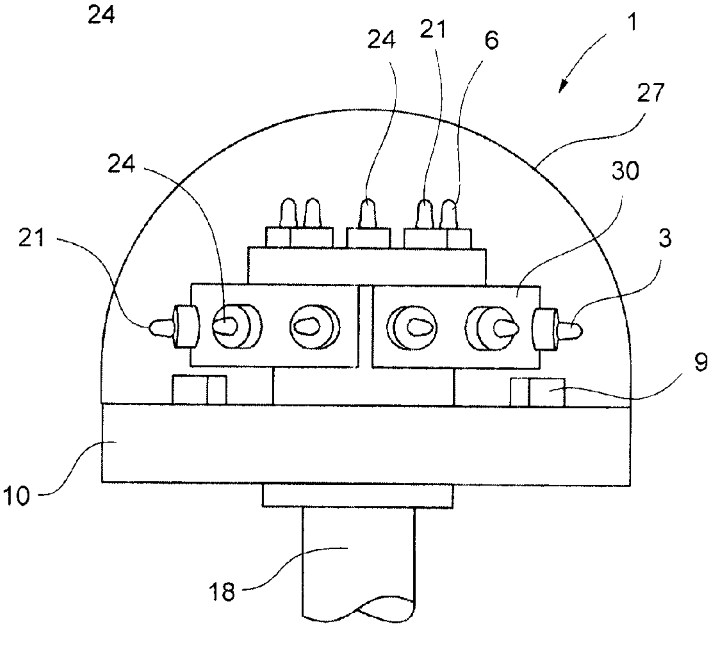
FIG. 2 depicts a side view of a preferred embodiment.
Figure 3:
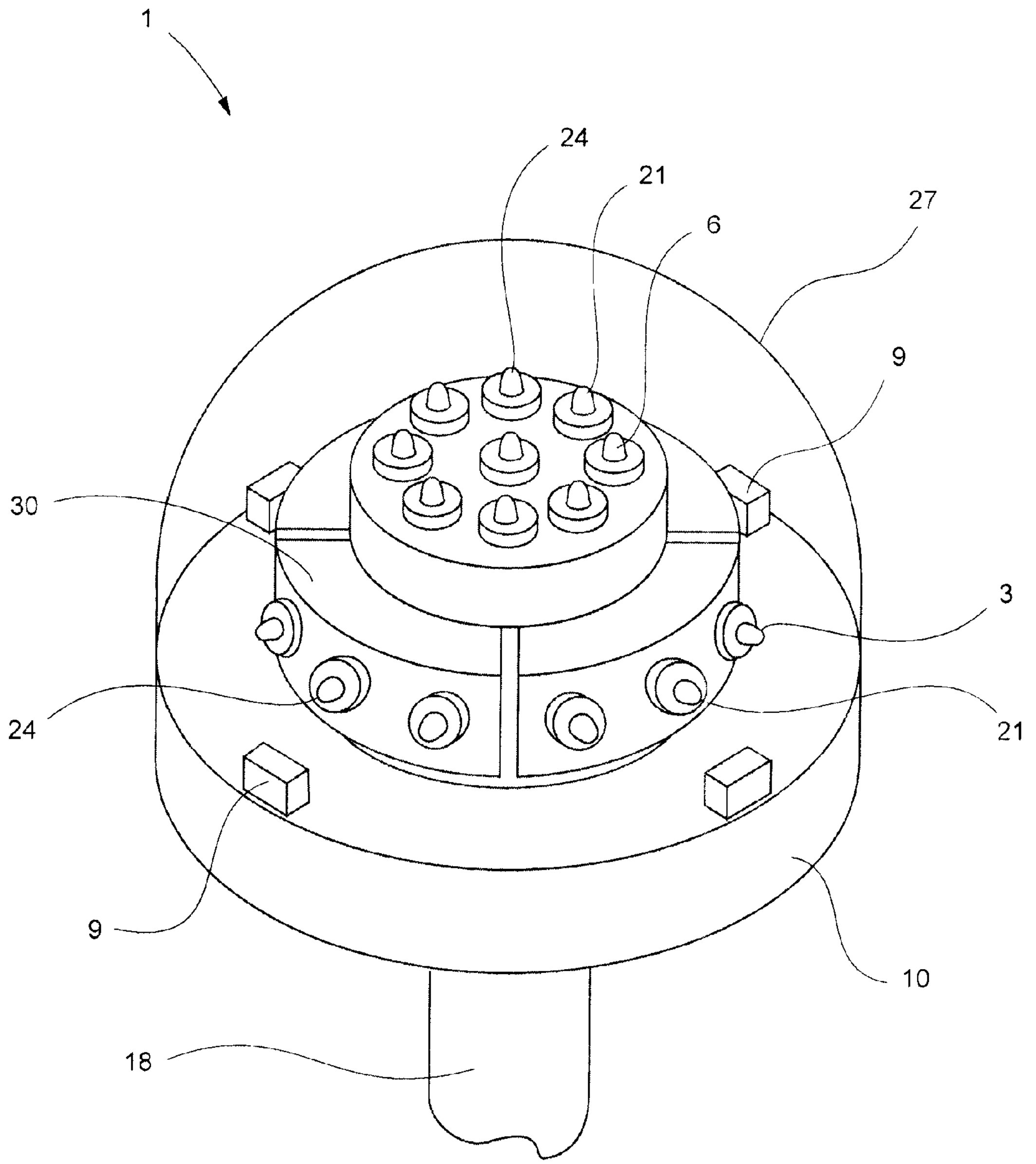
FIG. 3 shows a perspective view of a preferred embodiment.

Referring now to FIGS. 1-3, the present invention in a preferred embodiment preferably comprises boat light 1, wherein boat light 1 preferably comprises plurality of radially projecting lights 3, at least one axially upward projecting light 6 and at least one photometer 9. Plurality of radially project lights 3 are preferably arranged in a circular pattern, although one skilled in the art would recognize different patterns could be selected determined by the need. Accordingly, a boat light needing less than a 360 degree arc of visibility would preferably not have a circular pattern, rather the plurality of radially projecting lights 3 would preferably be arranged in a partial circle, dependant on the coverage arc needed. At least one photometer 9 is preferably positioned to best determine the amount of illumination from plurality of radially projecting lights 3, such as slightly below and slightly in front of plurality of radially projecting lights 3. At least one photometer 9 is further preferably disposed on frame 10. Frame 10 is optionally disposed on shaft 18 (best shown in FIGS. 2-3) to raise boat light 1 to the required height for display. Shaft 18 preferably is capable of housing batteries (not shown) for powering boat light 1. Boat light 1 preferably further comprises casing 27 to prevent moisture, contaminants and other environmental factors from affecting boat light 1, plurality of radially projecting lights 3, at least one axially upward projecting light 6 and at least one photometer 9, wherein casing 27 is disposed on frame 10.

Still referring to FIGS. 1-3, plurality of radially projecting lights 3 and at least one axially upward projecting light 6 are preferably light emitting diode (LED) 21 type lights. Further, plurality of radially projecting lights 3 and at least one axially upward projecting light 6 are preferably high intensity directional (HID) 24 LED 21 type lights.

Referring now more specifically to FIG. 1, plurality of radially projecting lights 3 can be seen preferably arranged along a circular path and preferably divided into banks 30 of radially projecting lights 3. Although twelve radially projecting lights 3 are shown in FIG. 1, one skilled in the art would recognize more or less radially projecting lights 3 could be utilized with similar structure and function. One skilled in the art would further recognize that although each banks 30 of radially projecting lights 3 is shown as a group of three radially projecting lights 3, wherein more or fewer radially projecting lights 3 could be utilized, and wherein plurality of radially projecting lights 3 could be subdivided into more or fewer than four banks 30 of radially projecting lights 3. Additionally, one skilled in the art would recognize other shapes for boat light 1, including without limitation, square, triangle, rectangle, circle or any other shape suitable for displaying boat light 1 would function equivalently. Similarly, frame 10 and casing 27 could also be of any suitable shape.

Still referring to FIG. 1, each of plurality of radially projecting lights 3 within each bank 30 of radially projecting lights 3 is preferably in serial communication 12 with each other. In this preferred arrangement, if any of plurality of radially projecting lights 3 within banks 30 of radially projecting lights 3 ceases to illuminate, substantially all of plurality of radially projecting lights 3 within banks 30 of radially projecting lights 3 preferably turn off. At least one photometer 9 dedicated to the particular bank 30 of radially projecting lights 3 senses if a portion of plurality of radially projecting lights 3 has ceased illuminating and therefore activate at least one axially upward projecting light 6. Thus, if photometer 9 senses a reduction in light intensity from plurality of radially projecting lights 3, at least one axially upward projecting light 6 is activated. Photometer 9 is controlled electronically, including computer control, as such is known in the art, wherein a selected decrease in light intensity from plurality of radially projecting lights 3 triggers a further electronic signal to activate or deactivate either or both of radially projecting lights 3 and/or at least one axially upward projecting light 6. Such activation or deactivation via a signal from photometer 9 could be via any known means, including, but not limited to, relays, silicon control rectifiers, transistors gated by flip-flops, or the like.

Additionally, upon failure of any of plurality of radially projecting lights 3, all of plurality of radially projecting lights 3 are deactivated, wherein malfunction of at least one of plurality of radially projecting lights 3 is more noticeable by boat operator. Contrarily, substantially each at least one axially upward projecting light 6 is preferably in parallel communication 15 with each other such that if one of at least one axially upward projecting light 6 fails, preferably all other of at least one axially upward projecting lights 6 will continue to illuminate, thereby providing redundancy to plurality of radially projecting lights 3.

Figure 4:
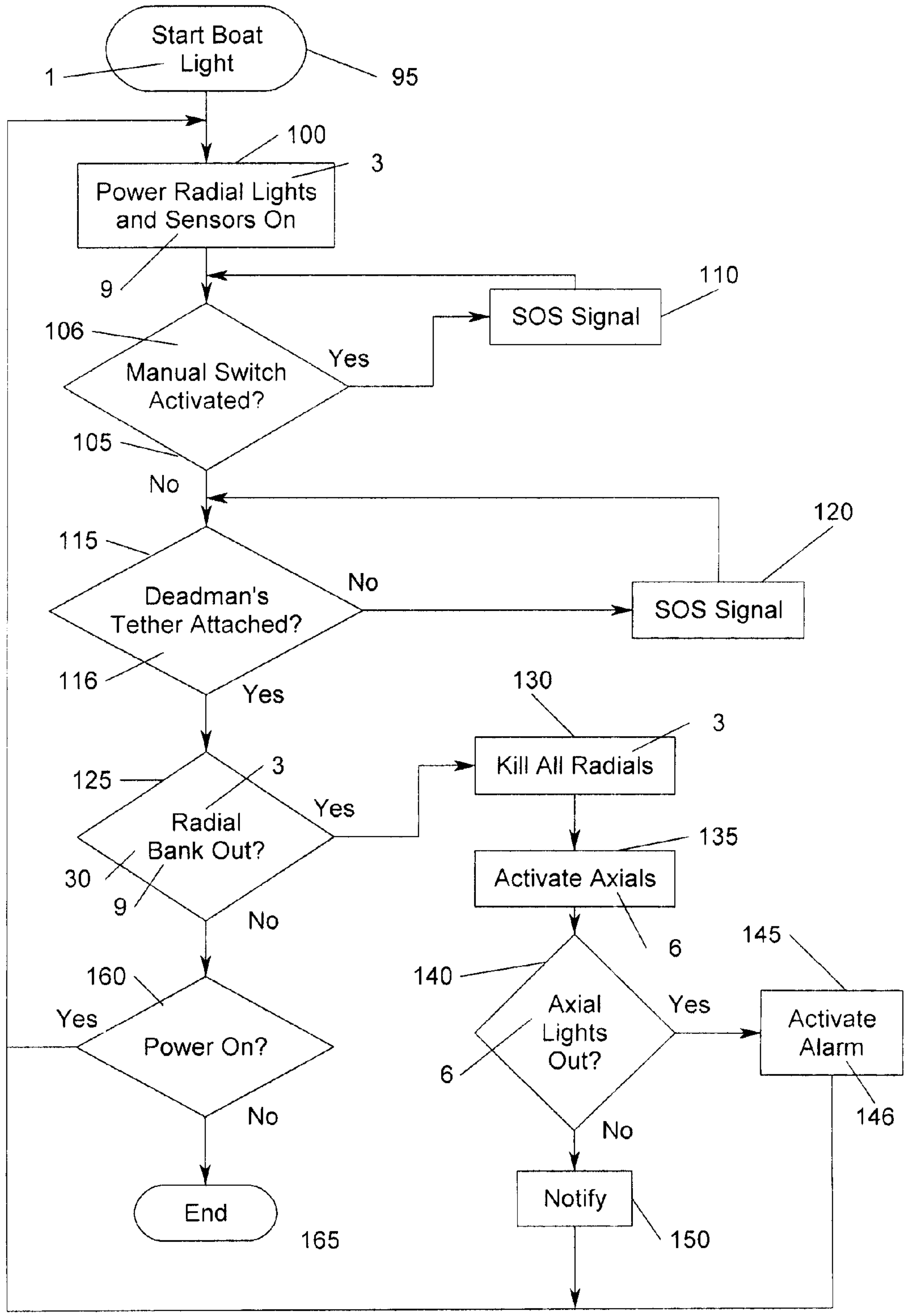
FIG. 4 depicts a flow chart of the operation and steps of a preferred embodiment.

Referring now more particularly to FIG. 4, operation of boat light 1 is shown, wherein start 95 supplies power to plurality of radially projecting lights 3, also displayed as radial lights 3 within FIG. 4 for brevity. Following start 95, plurality of radially projecting lights 3 and at least one photometer 9 (also shown as sensor 9) are preferably turned on via step 100. Once powered on, boat light 1 preferably checks to see if manual switch 106 is activated via step 105. Manual switch 106 is preferably a distress signal which can be activated by boat operator or boater during an emergency. If manual switch 106 is activated then SOS signal 110 is preferably activated and boat light 1 will continue to produce SOS signal 110 and repeatedly confirm, via step 105 that manual switch 106 is still engaged.

Still referring to FIG. 4, boat light 1 preferably checks to confirm dead man's tether 116 is attached to boat operator or boater in step 115. Dead man's tether 116 is meant as is known in the art, or alternatively could comprise a kill switch. Specifically, dead man's tether 116 secures to boat operator and to boat electrical panel, wherein when boat operator falls or otherwise disengages from the locality of boat electrical panel, an electrical or physical connection is severed to stop boat motors. In a preferred embodiment, disengagement of dead man's tether 116 will be recognized via step 115, and if dead man's tether 116 has been disengaged, SOS signal 120 is activated. Boat light 1 then preferably continues to produce SOS signal 120 and checks to see if dead man's tether 116 is reengaged via step 115. If dead man's tether 116 is reengaged, SOS signal 120 preferably ceases and operation of boat light 1 continues.

SOS signal 110, 120 preferably includes flashing both plurality of radially projecting lights 3 and at least one axially upward projecting light 6, preferably signaling SOS in Morse code. One skilled in the art would recognize that although SOS in Morse code is specifically referenced, alternatives to SOS could be utilized, such as, without limitation, other flashing patterns, visual signals, audio signals and/or any combination thereof. Additionally, SOS signal 110, 120 may optionally communicate with additional lighting, additional audible sound creators, GPS locators, other similar devices utilized in an emergency and/or any combination thereof.

Referring still to FIG. 4, after confirming manual switch 106 has not been activated via step 105 and confirming dead man's tether 116 is engaged via step 115, boat light 1 preferably determines if any of banks 30 of radially projecting lights 3 is inoperable and thus non-luminous via step 125. In a preferred embodiment, due to preferred serial communication 12 (best shown in FIG. 1) between plurality of radially projecting lights 3, failure of any individual of plurality of radially projecting lights 3 within banks 30 of radially projecting lights 3 will preferably cause failure of all of plurality of radially projecting lights 3 within banks 30 of radially projecting lights 3. Alternatively, at least one photometer 9 preferably senses if failure of any of plurality of radially projecting lights 3 is non-luminous via step 125. Upon at least one photometer 9 determining failure of at least one of plurality of radially projecting lights 3 or failure of at least one banks 30 of radially projecting lights 3, all of plurality of radially projecting lights 3 and consequently all of banks of radially projecting lights 30 are preferably turned off via step 130. However, if all of plurality of radially projecting lights 3 are functioning, boat light 1 then preferably confirms power is on via step 160 and returns to start 95. If power has ceased, boat light 1 turns off and ends via end 165.

Still referring to FIG. 4, if at least one bank 30 of plurality of radially projecting lights 3 is out, and once all of plurality of radially projecting lights 3 have been deactivated via step 130, boat light 1 preferably activates or turns on at least one axially upward projecting light 6, abbreviated axial lights on FIG. 4, via step 135. This serves to provide redundant lighting in case of failure of the primary light source, plurality of radially projecting lights 3, and further acts as a visual indicator to boat operator or boater that plurality of radially projecting lights 3 has failed.

Referring still to FIG. 4, after at least one axially upward projecting light 6 has been preferably activated via step 135, boat light 1 preferably determines if at least one axially upward projecting light 6 is functioning and thus illuminating via step 140. Status of at least one axially upward projecting light 6 in step 140 is determinable through electrical means, photometers, physical means and/or any combination thereof. If at least one axially upward projecting light 6 is functioning, notification is preferably sent to boat operator via step 150 that plurality of radially projecting lights 3 has failed. Alternatively, if at least one axially upward projecting light 6 has also failed, alarm 146 is preferably activated via step 145 to notify boat operator of failure of both at least one axially upward projecting light 6 and plurality of radially projecting lights 3. Boat light 1 then preferably returns to step 100 to power on plurality of radially projecting lights 3 continues checking to see if plurality of radially projecting lights 3 are now functional via step 125, checking to see if at least one axially upward projecting light 6 is functional via step 140 and checking for SOS signal 110, 120 conditions exist via step 105 and step 115.

The foregoing description and drawings comprise illustrative embodiments of the present invention. Having thus described exemplary embodiments of the present invention, it should be noted by those skilled in the art that the embodiments within disclosures are exemplary only, and that various other alternatives, adaptations and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are utilized in a generic and descriptive sense only and not for purposes of limitation. Accordingly, the present invention is not limited to the specific embodiments illustrated herein, but is limited only by the following claims.

What is claimed is:

1. A light comprising:

a casing;

a plurality of radially projecting high intensity directional light emitting diodes disposed entirely within said casing, wherein said plurality of radially projecting high intensity directional light emitting diodes are arranged in a plurality of banks;

at least one axially upward projecting light emitting diode disposed entirely within said casing; and a plurality of photometers, wherein each of said plurality of photometers senses the amount of light illuminating from a specific bank of said plurality of banks of said plurality of radially projecting high intensity directional light emitting diodes, and wherein upon any of said plurality of photometers sensing a decrease in illumination from any of said plurality of radially projecting high intensity directional light emitting diodes, all of said plurality of radially projecting high intensity directional light emitting diodes are deactivated and said at least one axially upward projecting light emitting diode is illuminated.

2. The light of claim 1, wherein at least a portion of said plurality of radially projecting high intensity directional light emitting diodes are in series electrical communication.

3. The light of claim 1, wherein said at least one axially upward projecting light emitting diode is in switchable parallel electrical communication with said plurality of radially projecting high intensity directional light emitting diodes.

4. The light of claim 1, wherein said at least one axially upward projecting light emitting diode is in parallel electrical communication with another at least one axially upward projecting light emitting diode.

5. The light of claim 1, wherein said light further comprises a shaft, and wherein said casing is disposed on said shaft.

6. The light of claim 5, wherein each of said plurality of radially projecting high intensity directional light emitting diodes is disposed perpendicular to said shaft.

7. The light of claim 1, wherein said plurality of photometers measure light output of at least a portion of said plurality of radially projecting high intensity directional light emitting diodes.

8. The light of claim 7, wherein all of said plurality of radially projecting high intensity directional light emitting diodes are switched off upon said plurality of photometers sensing a selected decrease in illumination from at least a portion of said plurality of radially projecting high intensity directional light emitting diodes.

9. The light of claim 7, wherein said at least one axially upward projecting light emitting diode is illuminated upon at least one of said plurality of photometers optically detecting a selected decrease in illumination from at least a portion of said plurality of radially projecting high intensity directional light emitting diodes.

10. The light of claim 1, wherein said plurality of radially projecting high intensity directional light emitting diodes and said at least one axially upward projecting light emitting diode are flashable.

11. The light of claim 10, wherein said light flashes at least 120 times per minute.

12. The light of claim 10, wherein said light flashes SOS in Morse code.

13. The light of claim 10, wherein said light flashes upon a condition, wherein said condition is selected from the group consisting of when electrical communication with an operator is lost, when physical communication with an operator is lost, and upon operator activation.

14. The light of claim 1, wherein said plurality of radially projecting high intensity directional light emitting diodes is divided into a plurality of banks, wherein each of said plurality of banks contains a sub-plurality of said plurality of radially projecting high intensity directional light emitting diodes.

15. The light of claim 14, wherein each of said sub-plurality of radially projecting high intensity directional light emitting diodes within each of said plurality of banks is in series electrical communication.

16. The light of claim 14, wherein said plurality of banks illuminates approximately 360 degrees horizontally.

17. The light of claim 14, wherein said plurality of banks of said plurality of radially projecting high intensity directional light emitting diodes illuminates less than 360 degrees horizontally.

18. The light of claim 17, wherein said plurality of banks illuminates a range, wherein said range is selected from the group consisting of approximately 225 degrees horizontally, approximately 112.5 degrees horizontally, and approximately 135 degrees horizontally.

19. A method of redundant lighting, wherein said method comprises the steps of:

illuminating a plurality of radially projecting lights disposed entirely within a casing, wherein said plurality of radially projecting lights is divided into a plurality of banks disposed in a common plane;

sensing light emitted by said plurality of radially projecting lights via an optical sensor; and illuminating at least one axially upward projecting light disposed entirely within said casing and deactivating all of said plurality of radially projecting lights, upon said optical sensor detecting a decrease in illumination from said plurality of radially projecting lights, wherein said at least one axially upward projecting light is disposed perpendicular to said plurality of banks.

* * * * *